(12) United States Patent
Hidaka

(10) Patent No.: US 8,473,016 B2  
(45) Date of Patent: Jun. 25, 2013

(54) COMMUNICATION APPARATUS, AND DATA TRANSMISSION METHOD

(75) Inventor: Isao Hidaka, Tokyo (JP)

(73) Assignee: Sony Corporation, Tokyo (JP)

( * ) Notice: Subject to any disclaimer, the term of this patent is extended or adjusted under 35 U.S.C. 154(b) by 191 days.

(21) Appl. No.: 13/089,540

(22) Filed: Apr. 19, 2011

(65) Prior Publication Data

US 2011/0269504 A1 Nov. 3, 2011

(30) Foreign Application Priority Data

Apr. 28, 2010 (JP) .............................. P2010-103705

(51) Int. Cl.
*H04M 1/00* (2006.01)

(52) U.S. Cl.
USPC ..................................... 455/575.3; 455/115.1

(58) Field of Classification Search
USPC .............. 455/63.1, 67.11, 67.13, 550.1, 570, 455/575.3, 114.2, 115.1
See application file for complete search history.

(56) References Cited

U.S. PATENT DOCUMENTS

| | | | |
|---|---|---|---|
| 2007/0004339 A1* | 1/2007 | Lin et al. ...................... | 455/63.3 |
| 2007/0141992 A1* | 6/2007 | Kwa et al. .................... | 455/63.1 |
| 2008/0311962 A1* | 12/2008 | Demuynck ............... | 455/575.1 |

FOREIGN PATENT DOCUMENTS

JP 03-109843 5/1991

* cited by examiner

*Primary Examiner* — Ping Hsieh  
(74) *Attorney, Agent, or Firm* — Finnegan, Henderson, Farabow, Garrett & Dunner, LLP

(57) ABSTRACT

Provided is a communication apparatus including a wireless communication unit for performing wireless communication by using a predetermined communication band, a data transmission unit for transmitting serial data through a predetermined transmission path, a jamming determination unit for determining whether or not a transmission band used for transmission of the serial data by the data transmission unit jams the communication band used for the wireless communication by the wireless communication unit, and a rate control unit for switching a transmission rate of the serial data to low by controlling the data transmission unit, in a case the jamming determination unit determines that the transmission band used for transmission of the serial data jams the communication band used for the wireless communication.

9 Claims, 12 Drawing Sheets

COMMUNICATION APPARATUS, AND DATA TRANSMISSION METHOD

BACKGROUND OF THE INVENTION

1. Field of the Invention

The present invention relates to a communication apparatus, and a data transmission method.

2. Description of the Related Art

Many portable appliances such as mobile phones and notebook PCs are configured from a main body equipped with operation means to be operated by a user and a display portion equipped with a display device such as an LCD. Also, a movable member is used for a hinge portion connecting the main body and the display portion. Normally, power lines and signal lines pass through this hinge portion. Thus, lines passing through the hinge portion are deteriorated according to transformation of the hinge portion. Accordingly, a refinement for preventing deterioration in the lines passing through the hinge portion occurring at the time of transformation of the hinge portion is desired. Additionally, the LCD is an abbreviation for Liquid Crystal Display.

To suppress deterioration occurring in the lines passing through the hinge portion, first, it is important to reduce the number of the lines passing through the hinge portion. Until now, a parallel transmission scheme was used in many cases for data transmission from the main body to the display portion. In the case of adopting the parallel transmission scheme, several tens of signal lines are to pass through the hinge portion to transmit image data to be displayed on the display device. Thus, there were risks that signal lines would be twisted due to the transformation of the hinge portion, and that the power lines and the signal lines would break. Accordingly, a method of adopting a serial transmission scheme, instead of the parallel transmission scheme, to data transmission of the hinge portion was devised.

In the case of the serial transmission scheme, data is encoded and then transmitted. At this time, for example, a Non Return to Zero (NRZ) encoding scheme, a Manchester encoding scheme, an Alternate Mark Inversion (AMI) encoding scheme, or the like is used as the encoding scheme. For example, JP-H3-109843A discloses a technology for transmitting data by using an AMI code, which is a representative example of a bipolar code. The patent document also discloses a technology according to which a data clock is transmitted after being expressed by an intermediate value of a signal level, and the receiving side regenerates the data clock based on the signal level.

SUMMARY OF THE INVENTION

If the serial transmission scheme is adopted as described above, the degree of freedom of the hinge portion's transformation is increased, and the design of the portable appliance can be improved. Furthermore, the number of lines is reduced and resistance to twisting and the like is improved, and thus reliability of the lines passing through the hinge portion is improved. However, in the case of the serial transmission scheme, since the amount of data transmitted per clock is reduced compared to the parallel transmission scheme, a high-speed clock has to be used to obtain the same data transmission rate. Particularly, a recent mobile terminal is equipped with an LCD with high resolution, and an extremely high speed clock has to be used to serially transmit image data to be displayed on the LCD.

However, if the transmission rate of the clock is accelerated, the transmission band used for transmission of serial data interferes with the communication band of wireless communication. Such interference is called electromagnetic interference (EMI). If EMI occurs, the communication quality of the wireless communication deteriorates, and there is a possibility that radio wave is not properly received. Therefore, a refinement for preventing occurrence of EMI by preventing interference, in the mobile terminal, between the transmission band of the serial transmission and the communication band of the wireless communication or for enabling proper reception of radio wave of the wireless communication even in the case of occurrence of EMI is desired.

In light of the foregoing, it is desirable to provide a communication apparatus and a data transmission method which are novel and improved, and which are capable of preventing quality deterioration of wireless communication caused due to interference between the transmission band of serial transmission and the communication band of the wireless communication.

According to an embodiment of the present invention, there is provided a communication apparatus which includes a wireless communication unit for performing wireless communication by using a predetermined communication band, a data transmission unit for transmitting serial data through a predetermined transmission path, a jamming determination unit for determining whether or not a transmission band used for transmission of the serial data by the data transmission unit jams the communication band used for the wireless communication by the wireless communication unit, and a rate control unit for switching a transmission rate of the serial data to low by controlling the data transmission unit, in a case the jamming determination unit determines that the transmission band used for transmission of the serial data jams the communication band used for the wireless communication.

In a case the wireless communication unit is performing wireless communication, the jamming determination unit may determine that the transmission band used for transmission of the serial data jams the communication band used for the wireless communication by the wireless communication unit.

In a case the wireless communication unit is receiving a radio wave, the jamming determination unit may determine that the transmission band used for transmission of the serial data jams the communication band used for the wireless communication by the wireless communication unit.

The communication apparatus may further include a reception intensity detection unit for detecting an intensity of the radio wave received by the wireless communication unit. Here, in a case the intensity of the radio wave detected by the reception intensity detection unit is less than a predetermined intensity, the jamming determination unit may determine that the transmission band used for transmission of the serial data jams the communication band used for the wireless communication by the wireless communication unit.

The communication apparatus may be formed from first and second modules connected via the predetermined transmission path. Here, the first module includes an arithmetic processing unit that outputs parallel data, and a parallel-serial conversion unit that generates the serial data by serializing the parallel data output by the arithmetic processing unit. Also, the data transmission unit transmits the serial data generated by the parallel-serial conversion unit through the predetermined transmission path. Furthermore, the second module includes a serial-parallel conversion unit that generates the parallel data by parallelizing the serial data transmitted by the data transmission unit, and an output unit that outputs the parallel data generated by the serial-parallel conversion unit.

The data transmission unit may transmit information relating to the transmission rate of the serial data together with the serial data.

According to another embodiment of the present invention, there is provided a data transmission method performed by a communication apparatus including a wireless communication unit for performing wireless communication by using a predetermined communication band and a data transmission unit for transmitting serial data through a predetermined transmission path, including the steps of determining whether or not a transmission band used for transmission of the serial data by the data transmission unit jams the communication band used for the wireless communication by the wireless communication unit, and switching a transmission rate of the serial data to low by controlling the data transmission unit, in a case of determining, in the step of determining, that the transmission band used for transmission of the serial data jams the communication band used for the wireless communication.

According to another embodiment of the present invention, there is provided a program for causing a computer to realize the functions of the jamming determination unit, the rate control unit, and the like provided in the communication apparatus. According to another embodiment of the present invention, there is provided a recording medium in which the program is recorded, the recording medium being able to be read by a computer.

According to the embodiments of the present invention described above, it is possible to prevent quality deterioration of wireless communication caused due to interference between the transmission band of serial transmission and the communication band of the wireless communication.

DETAILED DESCRIPTION OF THE EMBODIMENT(S)

Figure 1:
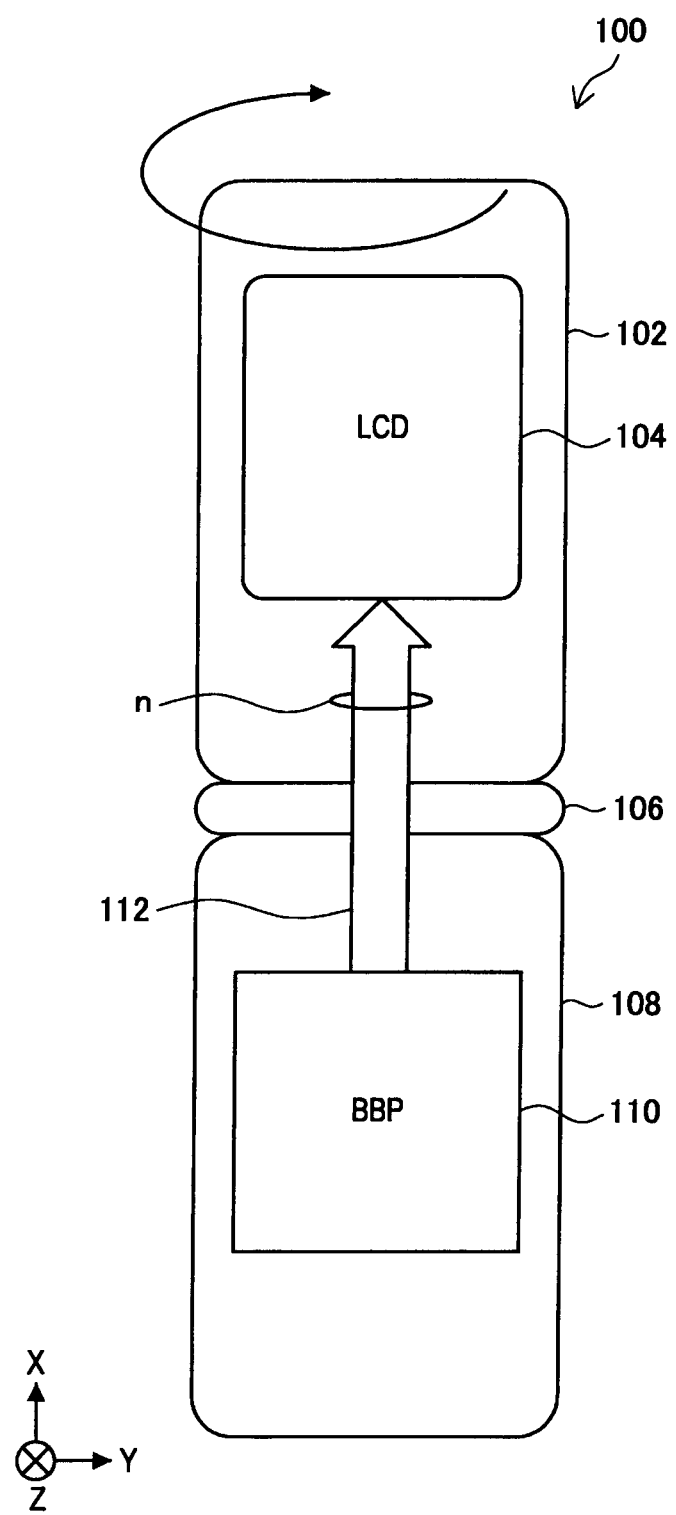
FIG. 1 is an explanatory diagram showing a configuration example of a mobile terminal adopting a parallel transmission scheme.

Hereinafter, preferred embodiments of the present invention will be described in detail with reference to the appended drawings. Note that, in this specification and the appended drawings, structural elements that have substantially the same function and structure are denoted with the same reference numerals, and repeated explanation of these structural elements is omitted.

[Flow of Description]

The flow of description of an embodiment of the present invention described below will be briefly mentioned here. First, a device configuration of a mobile terminal 100 adopting a parallel transmission scheme will be briefly described with reference to FIG. 1. Then, a device configuration of a mobile terminal 130 adopting a serial transmission scheme will be briefly described with reference to FIG. 2. Here, a data transmission method according to the serial transmission scheme will be supplementarily described with reference to FIG. 3.

Figure 4:
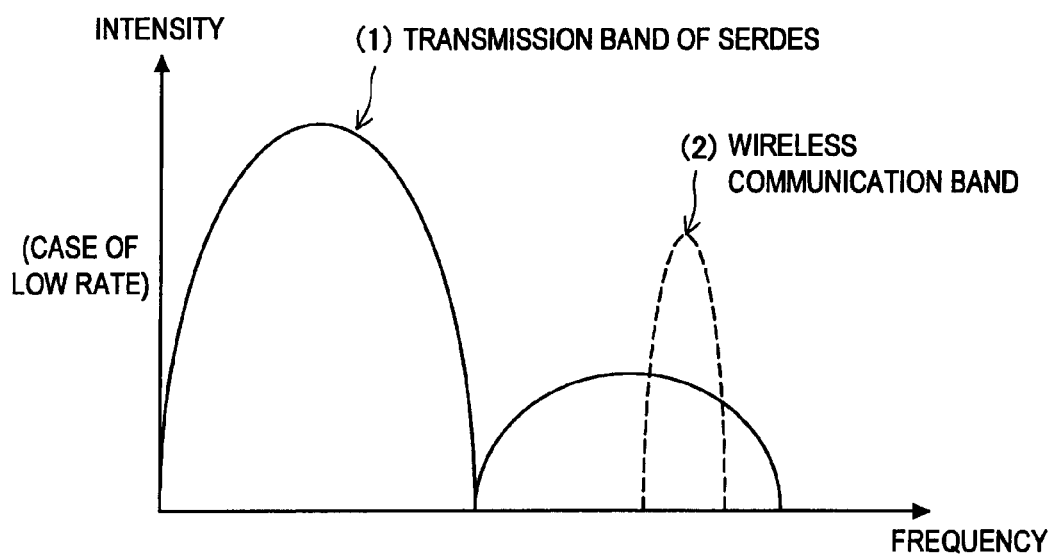
FIG. 4 is an explanatory diagram for describing jamming of a wireless communication band by a transmission band of serial transmission, and a control method of serial transmission rate according to an embodiment of the present invention.
Figure 5:
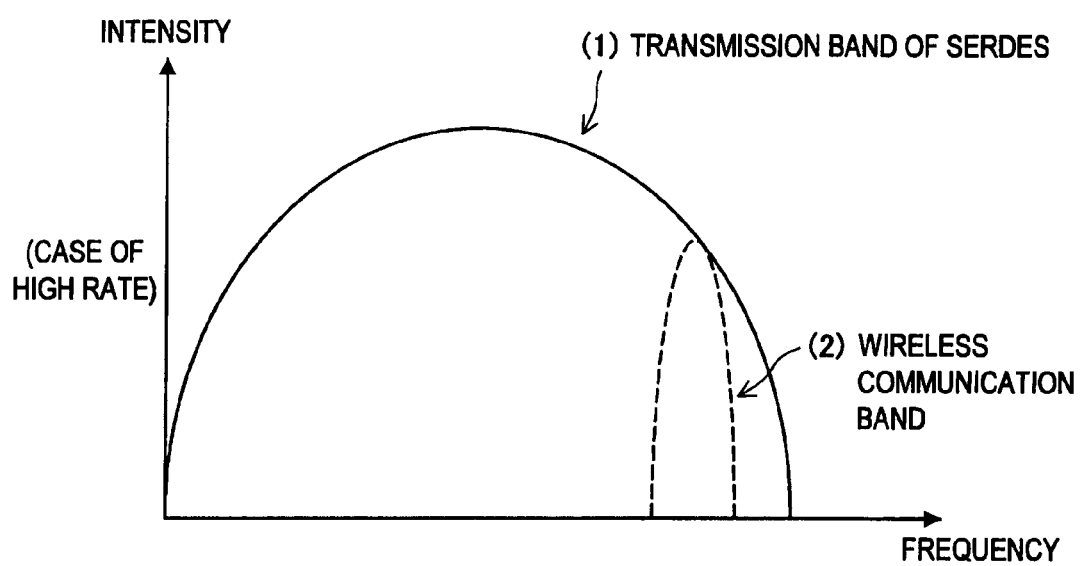
FIG. 5 is an explanatory diagram for describing jamming of a wireless communication band by a transmission band of serial transmission, and a control method of serial transmission rate according to the embodiment.

Then, the issue of deterioration in communication quality of wireless communication due to the interference between the transmission band of serial transmission and the communication band of wireless communication will be discussed with reference to FIGS. 4 and 5. Next, a transmission control method according to the present embodiment capable of preventing the communication quality of wireless communication deteriorating due to the interference between the transmission band of serial transmission and the communication band of wireless communication will be described with reference to FIG. 6.

Figure 7:
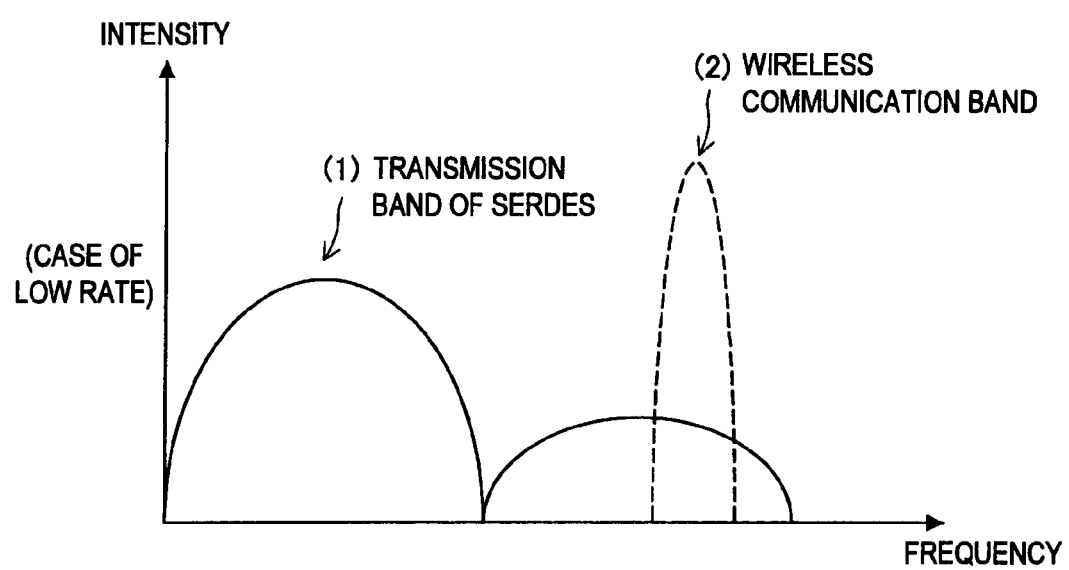
FIG. 7 is an explanatory diagram for describing jamming of a wireless communication band by a transmission band of serial transmission, and the control method of serial transmission rate according to the embodiment.
Figure 8:
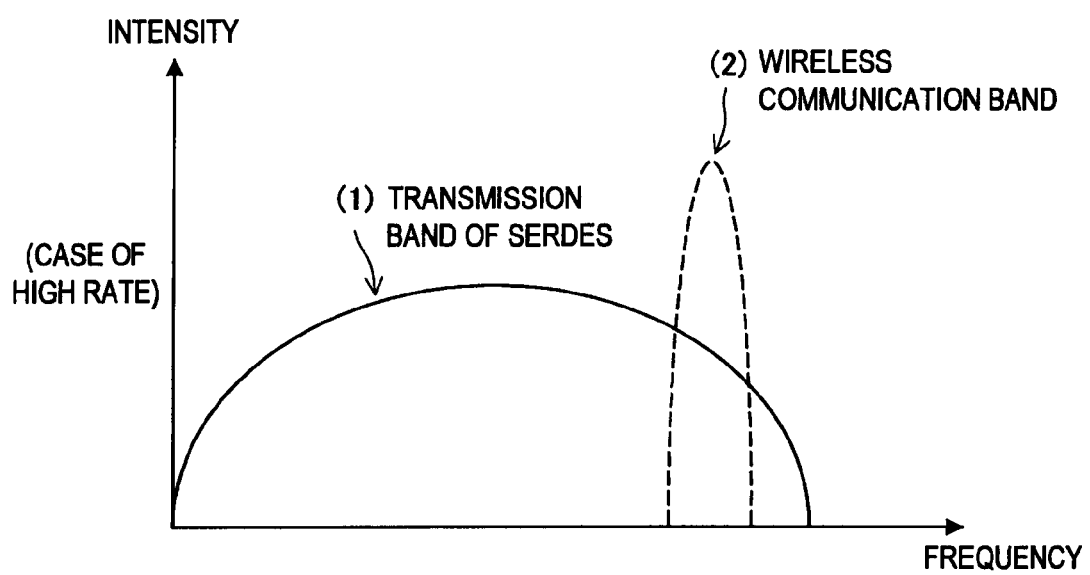
FIG. 8 is an explanatory diagram for describing jamming of a wireless communication band by a transmission band of serial transmission, and the control method of serial transmission rate according to the embodiment.

Next, a transmission control method according to the present embodiment that takes into account the interference between the transmission band of serial transmission and the communication band of wireless communication will be described with reference to FIGS. 7 and 8. Then, a functional configuration of the mobile terminal 130 capable of realizing the transmission control method according to the present embodiment will be described with reference to FIG. 9.

Next, a method of controlling serial transmission rate according to a period of performance of wireless communication will be described with reference to FIG. 10. Then, a method of controlling serial transmission rate according to switching of transmission/reception will be described with reference to FIG. 11. Then, a method of controlling serial transmission rate according to the intensity of a received radio wave will be described with reference to FIG. 12. Lastly, the technical idea of the present embodiment will be summarized and operational effects obtained by the technical idea will be briefly described.

(Description Items)

1: Introduction 1-1: Device Configuration of Mobile Terminal 100 Adopting Parallel Transmission Scheme 1-2: Device Configuration of Mobile Terminal 130 Adopting Serial Transmission Scheme 2: Embodiment
   2-1: Interference Between Serial Transmission Band and Wireless Communication Band
   2-2: Transmission Control Method
      2-2-1: Switching of Serial Transmission Rate
      2-2-2: Switching of Serial Transmission Rate According to Wireless Communication Timing
      2-2-3: Switching of Serial Transmission Rate According to Received Radio Wave Intensity
      2-2-4: Switching of Serial Transmission Rate at the Time of Transmission/Reception Switching
   2-3: Functional Configuration of Mobile Terminal 130
   2-4: Control Method of Serial Transmission Rate
      2-4-1: Control Method According to Wireless Communication Period
      2-4-2: Control Method According to Switching of Transmission/Reception
      2-4-3: Control Method According to Received Radio Wave Intensity
3: Summary 1: Introduction First, overviews of a parallel transmission scheme which has been used frequently in the past as a data transmission scheme of an appliance and a serial transmission scheme which will be used more frequently in the future will be briefly described taking device configurations of mobile terminals 100 and 130 adopting respective schemes as examples.

[1-1: Device Configuration of Mobile Terminal 100 Adopting Parallel Transmission Scheme]

First, a device configuration of the mobile terminal 100 adopting a parallel transmission scheme will be briefly described with reference to FIG. 1. FIG. 1 is an explanatory diagram showing an example of the device configuration of the mobile terminal 100 adopting a parallel transmission scheme. In FIG. 1, a mobile phone is schematically illustrated as an example of the mobile terminal 100. However, the application scope of the technology described below is not limited to a mobile phone. For example, it can be applied to an information processing apparatus such as a notebook PC or various portable electronic devices.

As shown in FIG. 1, the mobile terminal 100 mainly includes a display unit 102, a liquid crystal unit 104 (LCD), a connecting unit 106, an operation unit 108, a baseband processor 110 (BBP), and a parallel signal path 112. The LCD is an abbreviation for Liquid Crystal Display. Additionally, the display unit 102 and the operation unit 108 may be respectively referred to as a display side and a main body side. Additionally, for the sake of explanation, a case where an image signal is transmitted through the parallel signal path 112 will be described as an example. Of course, the type of a signal to be transmitted through the parallel signal path 112 is not limited to such, and it may also be a control signal, an audio signal, or the like, for example.

As shown in FIG. 1, the liquid crystal unit 104 is provided on the display unit 102. First, an image signal transmitted through the parallel signal path 112 is input to the liquid crystal unit 104. Then, the liquid crystal unit 104 displays an image based on the input image signal. Also, the connecting unit 106 is a member connecting the display unit 102 and the operation unit 108. The connecting member forming this connecting unit 106 has a structure that enables the display unit 102 to rotate 180 degrees in a Z-Y plane, for example. The connecting member can also be formed such that the display unit 102 can rotate in an X-Z plane. In this case, the mobile terminal 100 has a structure capable of folding. Additionally, the connecting member may also have a structure that allows the display unit 102 to move freely in any direction.

The baseband processor 110 is an arithmetic processing unit that provides the mobile terminal 100 with a communication control function and an application execution function. A parallel signal that is output from the baseband processor 110 is transmitted through the parallel signal path 112 to the liquid crystal unit 104 of the display unit 102. The parallel signal path 112 is provided with a large number of signal lines. In the case of a mobile phone, for example, the number n of the signal lines is approximately fifty lines. The image signal transmission rate is approximately 130 Mbps in a case where the resolution of the liquid crystal unit 104 is QVGA. The parallel signal path 112 is wired such that the lines pass through the connecting unit 106.

In other words, a large number of signal lines that form the parallel signal path 112 are provided in the connecting unit 106. As described above, if the range of movement of the connecting unit 106 is increased, the risk increases that the movement will inflict damage on the parallel signal path 112. This would result in impairment of the reliability of the parallel signal path 112. On the other hand, if the reliability of the parallel signal path 112 is to be maintained, the range of movement of the connecting unit 106 will be restricted, and the design or the functionality of the mobile terminal 100 will be impaired. It is for this reason that a mechanism for improving the degree of freedom of the movable member forming the connection unit 106 and also improving the reliability of the parallel signal path 112 is desired. The serial transmission scheme described later was thus devised.

In the foregoing, the device configuration of the mobile terminal 100 adopting the parallel transmission scheme has been described.

[1-2: Device Configuration of Mobile Terminal 130 Adopting Serial Transmission Scheme]

Figure 2:
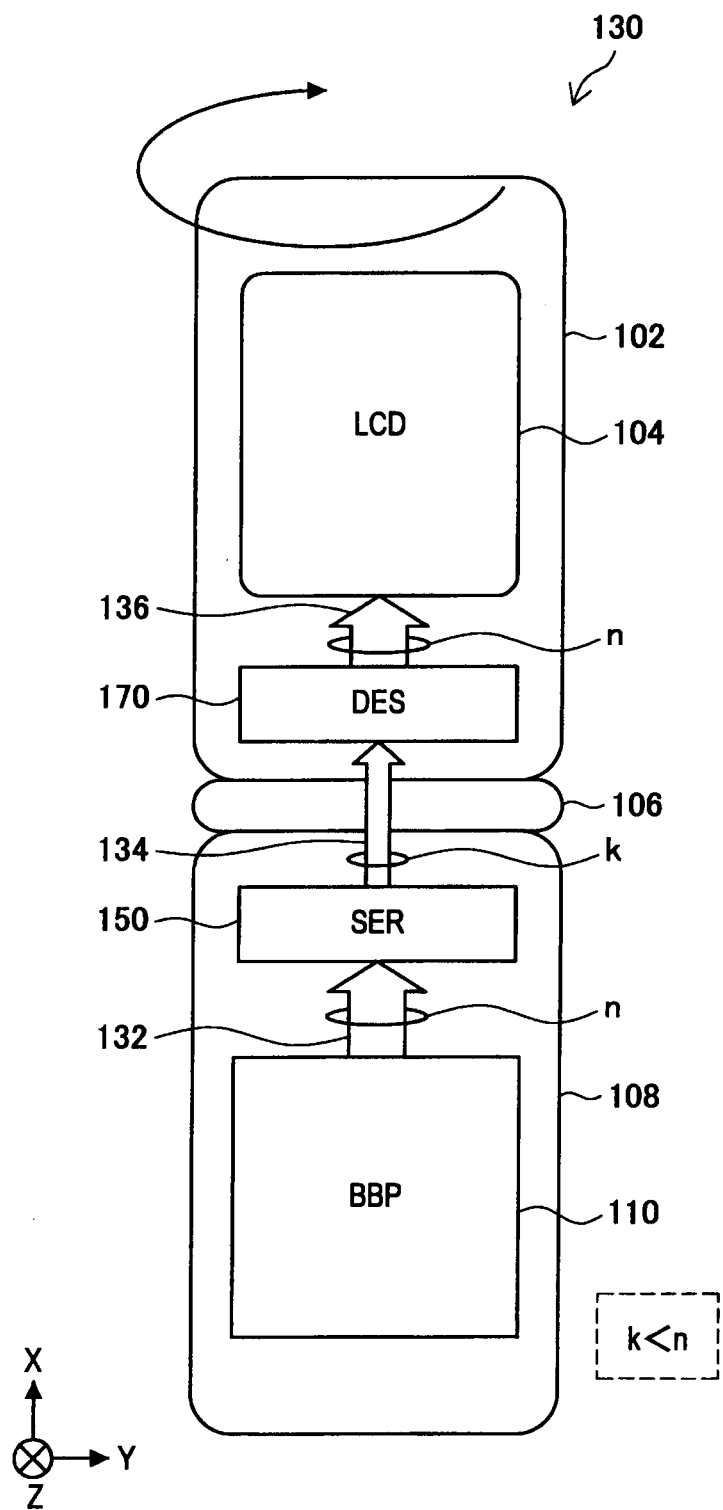
FIG. 2 is an explanatory diagram showing a configuration example of a mobile terminal adopting a serial transmission scheme.

Now, a device configuration of the mobile terminal 130 adopting the serial transmission scheme will be briefly described with reference to FIG. 2. FIG. 2 is an explanatory diagram showing an example of the device configuration of the mobile terminal 130 adopting the serial transmission scheme.

Additionally, in FIG. 2, a mobile phone is schematically illustrated as an example of the mobile terminal 130. However, the application scope of the technology described below is not limited to a mobile phone. For example, it can be applied to an information processing apparatus such as a notebook PC or various portable electronic devices. Furthermore, structural elements having functions substantially the same as those of the mobile terminal 100 adopting the parallel transmission scheme will be denoted with the same reference numerals, and detailed explanation of these structural elements will be omitted.

As shown in FIG. 2, the mobile terminal 130 mainly includes a display unit 102, a liquid crystal unit 104 (LCD), a connecting unit 106, and an operation unit 108. Also, the mobile terminal 130 includes a baseband processor 110 (BBP), parallel signal paths 132, 136, a serial signal path 134, a serializer 150, and a deserializer 170.

Unlike the mobile terminal 100 that is described above, the mobile terminal 130 transmits an image signal by the serial transmission scheme through the serial signal path 134 that is wired through the connecting unit 106. Therefore, the serializer 150 is provided in the operation unit 108 to serialize the parallel signal that is output from the baseband processor 110. On the other hand, the deserializer 170 is provided in the display unit 102 to parallelize the serial signal that is transmitted through the serial signal path 134.

Figure 3:
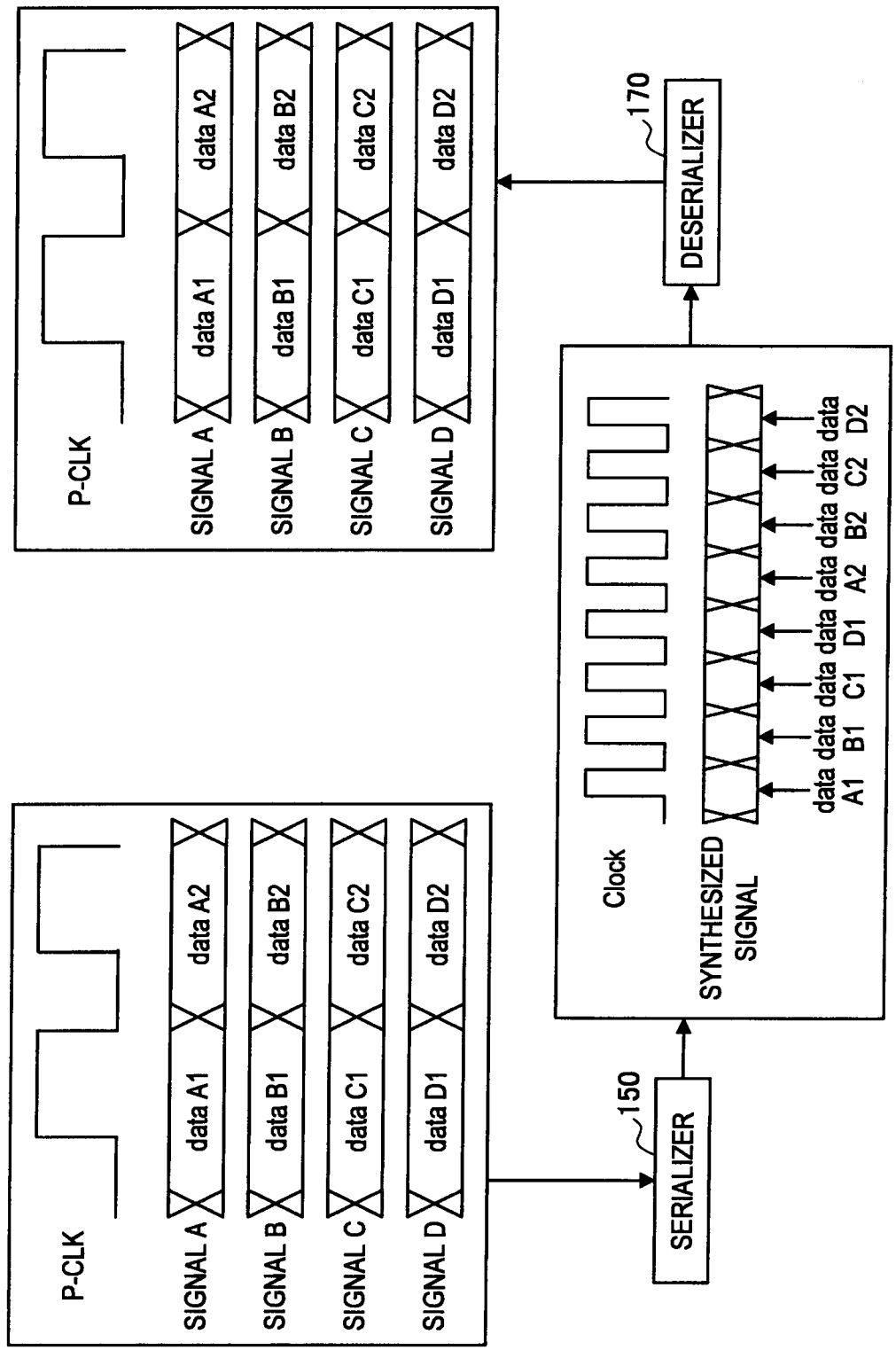
FIG. 3 is an explanatory diagram showing an example of a transmission method according to the serial transmission scheme.

The serializer 150 converts the parallel signal that is output from the baseband processor 110 and input through the parallel signal path 132 into a serial signal. For example, signal A, signal B, signal C, and signal D are input, in parallel, to the serializer 150 in synchronization with a parallel signal clock (P-CLK), as shown in FIG. 3.

Here, data A1 and data A2 are included in signal A. Also, data B1 and data B2 are included in signal B. Furthermore, data C1 and data C2 are included in signal C. Furthermore, data D1 and data D2 are included in signal D.

The serializer 150 synthesizes serially pieces of data, A1, A2, B1, B2, C1, C2, D1 and D2, included in signal A, signal B, signal C and signal D, and generates a synthesized signal that is synchronized with a serial signal clock (Clock) having four times the frequency of the parallel signal. This synthesized signal is the serial signal. The serial signal obtained by the serializer 150 is input to the deserializer 170 via the serial signal path 134.

When the serial signal is input, the deserializer 170 separates each piece of data from the input serial signal and restores the parallel signal. Then, the deserializer 170 inputs the parallel signal to the liquid crystal unit 104 through the parallel signal path 136. Additionally, a clock may also be transmitted to the serial signal path 134 together with the serial signal (data signal) obtained by synthesizing signal A, signal B, signal C, signal D, and the like. Furthermore, the serial signal may be transmitted according to a transmission scheme that uses a differential signal such as a low voltage differential signal (LVDS).

As described, by adopting the serial transmission scheme, the number k of the lines in the serial signal path 134 can be made significantly less than the number n of the lines in the parallel signal path 112 in the mobile terminal 100 in FIG. 1 ($1 \leq k \ll n$). For example, the number k of the lines can be reduced to a few lines at most. As a result, the degree of freedom of the range of movement of the connecting unit 106 in which the serial signal path 134 is wired can be made significantly greater than that of the connecting unit 106 in which the parallel signal path 112 is wired. Also, the reliability of the serial signal path 134 can be improved.

In the foregoing, the device configuration of the mobile terminal 130 adopting the serial transmission scheme has been described.

2: Embodiment

As described above, the serial transmission scheme is preferably adopted for transmission of a signal through the connecting unit 106 from the standpoint of the degree of freedom in the design of the mobile terminal 130 and the reliability of the serial signal path 134 passing through the connecting unit 106. However, the clock used for transmission of the serial signal is desired to have a higher frequency than the clock used for transmission of the parallel signal. For example, in FIG. 3, an example is shown where four signals which have been input in parallel are serialized and transmitted. In this case, the frequency of the clock necessary for transmission of the serial signal is four times that of the case of transmitting these four signals in parallel. That is, to realize serial transmission, a clock with a frequency that is higher compared to the case of realizing parallel transmission is used.

The type of a signal transmitted from the baseband processor 110 to the liquid crystal unit 104 may be a video signal corresponding to a colour, red, blue or green, a synchronization signal, or the like. For example, when it is assumed that a video signal which is 8 bits per colour is to be transmitted, about thirty signals will be transmitted at one time. In this case, the frequency of the clock used for serial transmission will be a frequency about thirty times that of the clock used for parallel transmission. Furthermore, the resolution of the liquid crystal unit 104 is more and more increased nowadays, and there is an increased necessity of transmitting image data from the baseband processor 110 to the liquid crystal unit 104 at a high rate. As a result, to increase the amount of data to be transmitted per unit time, the frequency of the clock used for serial transmission is increased.

As described above, increase in the data transmission rate leads to a higher clock frequency. Of course, research is conducted on the mechanism for increasing the amount of data that can be transmitted per clock. However, increasing the frequency of the clock is the simplest and most effective method for increasing the data transmission rate. Therefore, it is extremely important that the issue arising at the time of increasing the data transmission rate by increasing the frequency of a clock is solved. The issue to be discussed in the present embodiment is the issue of communication quality of wireless communication deteriorating due to interference between the transmission band used for serial transmission and the communication band used for wireless communication.

As described above, based on the demand for increase in the data transmission rate posed by enhancement of the resolution of the liquid crystal unit 104 or the like, the frequency of the clock used for serial transmission has come to reach the communication band that is used for wireless communication. Thus, a measure of shielding the serial signal path 134 has been considered in the past, for example. However, it is difficult to completely prevent interference of a radio wave by a shield or the like. For example, in the case the intensity of the radio wave received by wireless communication is weak, the radio wave is not accurately received due to radiation caused at the time of a serial signal flowing through the serial signal path 134. Thus, the inventor of the present invention has focused on that (1) wireless communication is not performed at all times, (2) the intensity of a radio wave of wireless communication is not constant throughout, and (3) influence of interference is different for the time of transmission and the time of reception of wireless communication, and has devised a transmission control method for solving the above issue.

[2-1: Interference Between Serial Transmission Band and Wireless Communication Band]

First, interference between a transmission band used for serial transmission (hereinafter, serial transmission band) and a communication band used for wireless communication (hereinafter, wireless communication band) will be described with reference to FIGS. 4 and 5. As described above, with the increase in the data transmission rate, the serial transmission band shifts to a higher frequency band. Furthermore, when the serial transmission band reaches the wireless communication band, interference is caused between the serial transmission band and the wireless communication band, as shown in FIG. 5. However, as shown in FIG. 4, when the data transmission rate is low, the main lobe of the serial transmission band and the wireless communication band does not interfere with each other, and no significant influence is exerted on the communication quality of the wireless communication.

Accordingly, to prevent interference between the serial transmission band and the wireless communication band, it is adequate to control the data transmission rate to a low rate. However, this will go against the demand for increase in the data transmission rate. Thus, the present embodiment proposes a transmission control method of enabling a substantially high data transmission rate while avoiding interference between the serial transmission band and the wireless communication band.

[2-2: Transmission Control Method]

In the following, the transmission control method according to the present embodiment will be described.

(2-2-1: Switching of Serial Transmission Rate)

The transmission control method according to the present embodiment relates to a method of switching the serial transmission rate. As described above, interference occurring between the serial transmission band and the wireless communication band occurs when the data transmission rate is high. Thus, if the serial transmission rate can be switched to low in the case interference occurs between the serial transmission band and the wireless communication band or in the case the interference is significant, deterioration in the communication quality of the wireless communication caused by the interference can be avoided. However, if the period where the serial transmission rate is low is long, a necessary data transmission rate is not obtained and display of the liquid crystal unit 104 becomes fuzzy, for example.

(2-2-2: Switching of Serial Transmission Rate According to Wireless Communication Timing)

Figure 6:
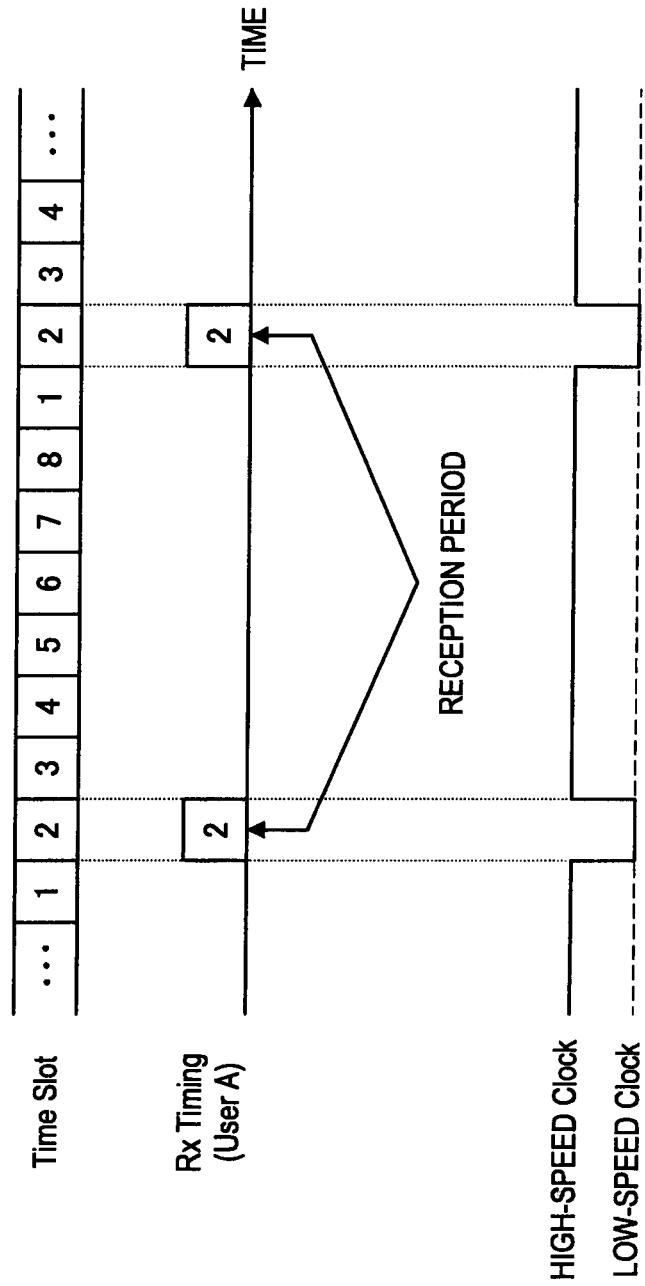
FIG. 6 is an explanatory diagram for describing the control method of serial transmission rate according to the embodiment.

Thus, the inventor of the present invention first focused on that (1) wireless communication is not performed at all times. As shown in FIG. 6, a mobile terminal 130 is assigned a predetermined time slot by a base station, and wireless communication through an up- or downlink is performed in the period of the time slot. In the example of FIG. 6, a time slot No. 2 is assigned to the downlink (reception) of the mobile terminal 130. In the case of this example, the mobile terminal 130 does not perform wireless communication (reception) during the period corresponding to time slots Nos. 1 and 3 to 8. That is, even if high-speed serial transmission is performed by the mobile terminal 130 in the period corresponding to time slots Nos. 1 and 3 to 8, no interference between the serial transmission band and the wireless communication band is caused.

Thus, the mobile terminal 130 according to the present embodiment controls the serial transmission rate to a low rate in the period of the time slot assigned to the mobile terminal 130. That is, this mobile terminal 130 switches the serial transmission rate to low at the timing of start of the time slot assigned to itself and switches the serial transmission rate to high at the timing of end of the time slot. According to this configuration, the period where the mobile terminal 130 can perform wireless communication will have a spectrum as shown in FIG. 4, and deterioration in the communication quality of the wireless communication caused by interference occurring between the serial transmission band and the wireless communication band can be avoided. On the other hand, the period where the mobile terminal 130 is not allowed to perform wireless communication will have a serial transmission band spectrum as shown in FIG. 5, but since the mobile terminal 130 will not perform wireless communication, interference between the serial transmission band and the wireless communication band will not be an issue.

By controlling the serial transmission rate to a low rate only during the period of the time slot assigned to oneself as described, interference between the serial transmission band and the wireless communication band can be avoided. Also, since the period during which the serial transmission rate becomes low is limited, influence on the substantial data transmission rate is limited. Accordingly, by providing the mechanism described above, the communication quality of the wireless communication can be improved while hardly sacrificing the data transmission rate.

(2-2-3: Switching of Serial Transmission Rate According to Received Radio Wave Intensity)

The inventor of the present invention next focused on that (2) the intensity of a radio wave of wireless communication is not constant throughout. In the case of the mobile terminal 130, the distance to a base station, the location of a radio wave obstacle present between the mobile terminal 130 and the base station, and the like are not constant. Thus, the intensity of the radio wave the mobile terminal 130 receives from the base station is not constant throughout. For example, as shown in FIG. 8, in the case the mobile terminal 130 is near the base station, the serial transmission rate is high and even if the serial transmission band and the wireless communication band interferes with each other, wireless communication may be enabled with a satisfactory communication quality. Of course, as shown in FIG. 7, in the case the serial transmission rate is low, a desirable communication quality can be obtained in wireless communication.

Thus, the mobile terminal 130 according to the present embodiment measures the intensity of a received radio wave, and performs control to switch the serial transmission rate to low only when the intensity of the received radio wave falls below a predetermined threshold. That is, this mobile terminal 130 maintains the serial transmission rate at a high rate when the intensity of the received radio wave is high (corresponding to the case in FIG. 8), and switches the serial transmission rate to low when the intensity of the received radio wave is low (corresponding to the case in FIG. 5) (see FIG. 4). As described, by maintaining the serial transmission rate at a high rate in the case the intensity of the received radio wave is high, even in the period of the time slot assigned to oneself, decrease in the substantial data transmission rate can be suppressed.

(2-2-4: Switching of Serial Transmission Rate at the Time of Transmission/Reception Switching)

The inventor of the present embodiment then focused on that (3) influence of interference is different for the time of transmission and the time of reception of wireless communication. As described above, the intensity of a radio wave that the mobile terminal 130 receives from a base station is different depending on the distance between the mobile terminal 130 and a base station, location of a radio wave obstacle present between the mobile terminal 130 and the base station, and the like.

On the other hand, the intensity of a radio wave that the mobile terminal 130 sends out is nearly constant at the position of the mobile terminal 130. That is, in the case the intensity of a transmitted radio wave is high enough that the spectrum shown in FIG. 8 is obtained, the serial transmission rate does not have to be made low at the time of transmission in the wireless communication. Also, the intensity of a transmitted radio wave in the wireless communication is actually high enough that the spectrum shown in FIG. 8 is obtained.

Accordingly, the mobile terminal 130 according to the present embodiment performs control so as to switch the serial transmission rate to low at the time of reception in the wireless communication and to maintain the serial transmission rate at a high rate at the time of transmission. Of course, in the case the intensity of a received radio wave is high, the mobile terminal 130 may perform control so as to maintain the serial transmission rate at a high rate even at the time of reception in the wireless communication. By maintaining the serial transmission rate at a high rate at the time of transmission, the substantial data communication rate can be further increased while suppressing the deterioration in communication quality caused due to interference between the serial transmission band and the wireless communication band.

[2-3: Functional Configuration of Mobile Terminal 130]

Figure 9:
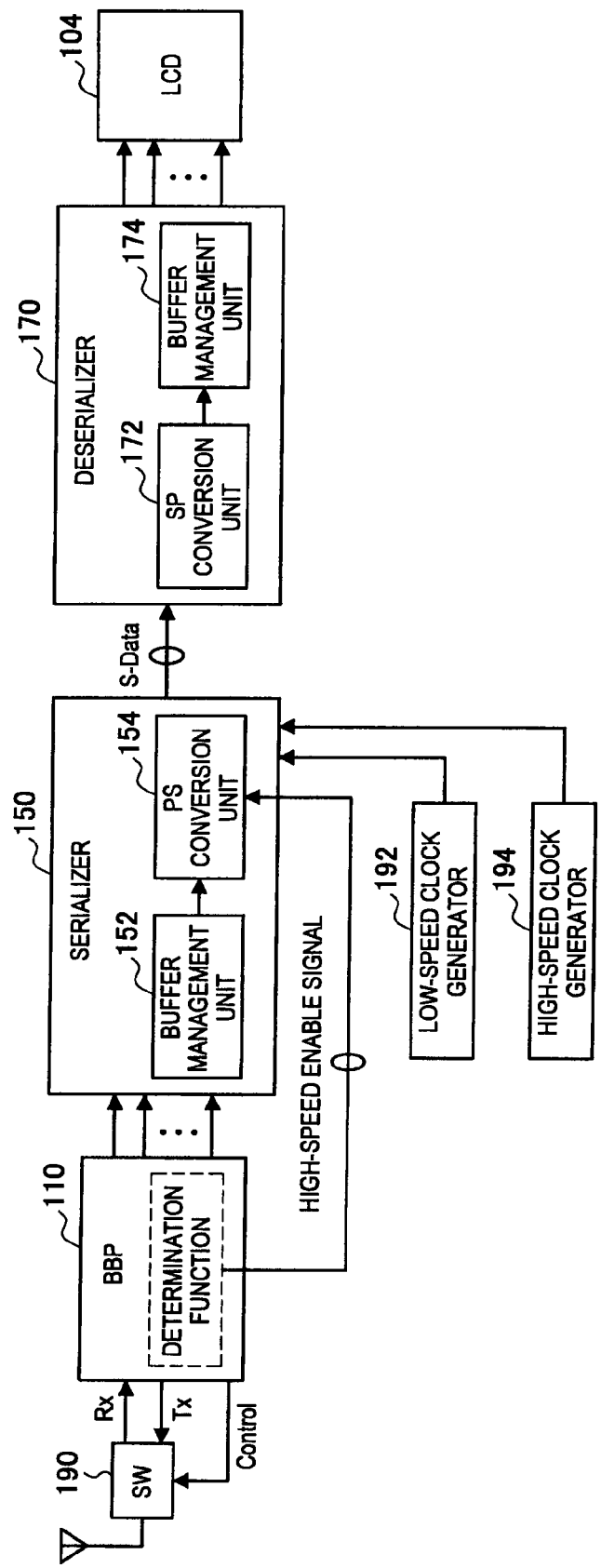
FIG. 9 is an explanatory diagram for describing a configuration of a mobile terminal according to the embodiment.

Next, the functional configuration of the mobile terminal 130 described above according to the present embodiment capable of realizing control of serial transmission rate will be described with reference to FIG. 9. FIG. 9 is an explanatory diagram for describing the functional configuration of the mobile terminal 130 according to the present embodiment.

As shown in FIG. 9, a baseband processor 110 provided in the mobile terminal 130 has a determination function described later. Also, a serializer 150 provided in the mobile terminal 130 includes a buffer management unit 152, and a PS conversion unit 154. Furthermore, a deserializer 170 provided in the mobile terminal 130 includes an SP conversion unit 172, and a buffer management unit 174. Furthermore, the mobile terminal 130 includes a switch 190, a low-speed clock generator 192, and a high-speed clock generator 194.

The switch 190 is means for switching between transmission and reception of antenna. Also, the low-speed clock generator 192 is means for generating a clock for which a frequency is set low (hereinafter, a low-speed clock) so that the serial transmission band and the wireless communication band do not interfere with each other. On the other hand, the high-speed clock generator 194 is means for generating a clock for which a high frequency is set (hereinafter, high-speed clock) tolerating interference between the serial transmission band and the wireless communication band. This frequency is set, according to the rate of data transmission from the serializer 150 to the deserializer 170, the encoding scheme, or the like, to a frequency that can realize such data transmission rate.

The low-speed clock generated by the low-speed clock generator 192 and the high-speed clock generated by the high-speed clock generator 194 are input to the serializer 150. Additionally, the operations of the low-speed clock generator 192 and the high-speed clock generator 194 may be controlled by the baseband processor 110. The baseband processor 110 has a determination function of determining, according to the state of interference between the serial transmission band and the wireless communication band, whether to use the low-speed clock or the high-speed clock. Thus, the baseband processor 110 may operate the low-speed clock generator 192 in the case it has determined to use a low-speed clock and may operate the high-speed clock generator 194 in the case it has determined to use a high-speed clock.

The determination function of the baseband processor 110 determines whether or not wireless communication is jammed by the interference between the serial transmission band and the wireless communication band in the case serial transmission is performed with a high-speed clock. Specifically, the determination function of the baseband processor 110 determines (1) whether or not wireless communication is being performed, (2) whether or not the intensity of a received radio wave of the wireless communication is above a predetermined threshold, and (3) whether it is transmission period or reception period.

(Case 1: Situation Where Wireless Communication is Not Performed)

For example, in the case (1) wireless communication is not performed, the determination function of the baseband processor 110 inputs a high-speed enable signal to the serializer 150. This high-speed enable signal is a control signal for controlling the serializer 150 to perform high-speed serial transmission by using a high-speed clock.

When the high-speed enable signal is input, the serializer 150 performs serial transmission by using a high-speed clock.

For example, a case is considered where image data is transmitted from the baseband processor 110 to the liquid crystal unit 104. First, image data output from the baseband processor 110 is input to the serializer 150, and is saved at the buffer management unit 152 provided in the serializer 150. Then, the image data saved at the buffer management unit 152 is read by the PS conversion unit 154, and is converted into a serial signal. At this time, the PS conversion unit 154 generates the serial signal by synchronizing the image data read from the buffer management unit 152 with a high-speed clock and performing parallel-serial conversion.

The serial signal generated by the PS conversion unit 154 is transmitted to the deserializer 170 through the serial signal path 134. At this time, the PS conversion unit 154 transmits together, to the deserializer 170, the type (low-speed clock/high-speed clock) of the clock used for the transmission of the serial signal. In this case, the serial transmission rate is high. Accordingly, information indicating a high-speed clock is transmitted to the deserializer 170 together with the serial signal. The serial signal and the information indicating the type of the clock (hereinafter, clock type information) transmitted to the deserializer 170 in this manner are input to the SP conversion unit 172 provided in the deserializer 170.

When the serial signal and the clock type information are input, the original image data is restored from the serial signal according to the clock being transmitted. Here, the high-speed clock used at the time of performing serial-parallel conversion at the SP conversion unit 172 provided in the deserializer 170 may be separately generated at the deserializer 170, or may be supplied from the serializer 150 together with the serial signal, or a mechanism for extracting the clock from the serial signal (see JP-2009-267624A, for example) may be provided.

The image data restored by the SP conversion unit 172 is input to the buffer management unit 152, and is saved by the buffer management unit 152. Then, the image data saved by the buffer management unit 152 is input to the liquid crystal unit 104, and is displayed on the liquid crystal unit 104. Additionally, the deserializer 170 adjusts the timing of inputting the image data to the liquid crystal unit 104 according to the type of clock indicated by the clock type information.

(Case 2: Situation Where Wireless Communication is Performed)

On the other hand, in the case (1) wireless communication is performed, the determination function of the baseband processor 110 does not input a high-speed enable signal to the serializer 150.

In a state where a high-speed enable signal is not input, the serializer 150 performs serial transmission by using a low-speed clock. Considering a case of transmitting image data from the baseband processor 110 to the liquid crystal unit 104, first, image data output from the baseband processor 110 is input to the serializer 150. Next, the image data input to the serializer 150 is saved at the buffer management unit 152 provided in the serializer 150. Then, the image data saved at the buffer management unit 152 is read by the PS conversion unit 154, and is converted into a serial signal. At this time, the PS conversion unit 154 generates the serial signal by synchronizing the image data read from the buffer management unit 152 with a low-speed clock and performing parallel-serial conversion.

The serial signal generated by the PS conversion unit 154 is transmitted to the deserializer 170 through the serial signal path 134. At this time, the PS conversion unit 154 transmits together, to the deserializer 170, clock type information. In this case, the serial transmission rate is low. Accordingly, clock type information indicating a low-speed clock is transmitted to the deserializer 170 together with the serial signal. The serial signal and the clock type information transmitted to the deserializer 170 in this manner are input to the SP conversion unit 172 provided in the deserializer 170.

When the serial signal and the clock type information are input, the original image data is restored from the serial signal according to the clock being transmitted. Here, the low-speed clock used at the time of performing serial-parallel conversion at the SP conversion unit 172 provided in the deserializer 170 may be separately generated at the deserializer 170, or may be supplied from the serializer 150 together with the serial signal, or a mechanism for extracting the clock from the serial signal (see JP-2009-267624A, for example) may be provided.

The image data restored by the SP conversion unit 172 is input to the buffer management unit 152, and is saved by the buffer management unit 152. Then, the image data saved by the buffer management unit 152 is input to the liquid crystal unit 104, and is displayed on the liquid crystal unit 104. Additionally, the deserializer 170 adjusts the timing of inputting the image data to the liquid crystal unit 104 according to the type of clock indicated by the clock type information.

(Case 3: Case Where Intensity of Received Radio Wave is Above Predetermined Threshold)

Furthermore, in the case (2) the intensity of a received radio wave is above a predetermined threshold, the determination function of the baseband processor 110 inputs a high-speed enable signal to the serializer 150.

When the high-speed enable signal is input, the serializer 150 performs serial transmission by using a high-speed clock. Considering a case of transmitting image data from the baseband processor 110 to the liquid crystal unit 104, first, image data output from the baseband processor 110 is input to the serializer 150. Then, the image data input to the serializer 150 is saved at the buffer management unit 152 provided in the serializer 150. Then, the image data saved at the buffer management unit 152 is read by the PS conversion unit 154, and is converted into a serial signal. At this time, the PS conversion unit 154 generates the serial signal by synchronizing the image data read from the buffer management unit 152 with a high-speed clock and performing parallel-serial conversion.

The serial signal generated by the PS conversion unit 154 is transmitted to the deserializer 170 through the serial signal path 134. At this time, the PS conversion unit 154 transmits together, to the deserializer 170, clock type information. In this case, the serial transmission rate is high. Accordingly, information indicating a high-speed clock is transmitted to the deserializer 170 together with the serial signal. The serial signal and the clock type information transmitted to the deserializer 170 in this manner are input to the SP conversion unit 172 provided in the deserializer 170.

When the serial signal and the clock type information are input, the original image data is restored from the serial signal according to the clock being transmitted. Here, the high-speed clock used at the time of performing serial-parallel conversion at the SP conversion unit 172 provided in the deserializer 170 may be separately generated at the deserializer 170, or may be supplied from the serializer 150 together with the serial signal, or a mechanism for extracting the clock from the serial signal (see JP-2009-267624A, for example) may be provided.

The image data restored by the SP conversion unit 172 is input to the buffer management unit 152, and is saved by the buffer management unit 152. Then, the image data saved by the buffer management unit 152 is input to the liquid crystal unit 104, and is displayed on the liquid crystal unit 104. Additionally, the deserializer 170 adjusts the timing of inputting the image data to the liquid crystal unit 104 according to the type of clock indicated by the clock type information.

(Case 4: Case Where Intensity of Received Radio Wave is Below Predetermined Threshold)

On the other hand, in the case (2) the intensity of a received radio wave is below a predetermined threshold, the determination function of the baseband processor 110 does not input a high-speed enable signal to the serializer 150.

Since a high-speed enable signal is not input, the serializer 150 performs serial transmission by using a low-speed clock. Considering a case of transmitting image data from the baseband processor 110 to the liquid crystal unit 104, first, image data output from the baseband processor 110 is input to the serializer 150. Next, the image data input to the serializer 150 is saved at the buffer management unit 152 provided in the serializer 150. Then, the image data saved at the buffer management unit 152 is read by the PS conversion unit 154, and is converted into a serial signal. At this time, the PS conversion unit 154 generates the serial signal by synchronizing the image data read from the buffer management unit 152 with a low-speed clock and performing parallel-serial conversion.

The serial signal generated by the PS conversion unit 154 is transmitted to the deserializer 170 through the serial signal path 134. At this time, the PS conversion unit 154 transmits together, to the deserializer 170, clock type information. In this case, the serial transmission rate is low. Accordingly, information indicating a low-speed clock is transmitted to the deserializer 170 together with the serial signal. The serial signal and the clock type information transmitted to the deserializer 170 in this manner are input to the SP conversion unit 172 provided in the deserializer 170.

When the serial signal and the clock type information are input, the original image data is restored from the serial signal according to the clock being transmitted. Here, the low-speed clock used at the time of performing serial-parallel conversion at the SP conversion unit 172 provided in the deserializer 170 may be separately generated at the deserializer 170, or may be supplied from the serializer 150 together with the serial signal, or a mechanism for extracting the clock from the serial signal (see JP-2009-267624A, for example) may be provided.

The image data restored by the SP conversion unit 172 is input to the buffer management unit 152, and is saved by the buffer management unit 152. Then, the image data saved by the buffer management unit 152 is input to the liquid crystal unit 104, and is displayed on the liquid crystal unit 104. Additionally, the deserializer 170 adjusts the timing of inputting the image data to the liquid crystal unit 104 according to the type of clock indicated by the clock type information.

(Case 5: Case of Transmission Period)

Furthermore, in the case (3) it is a transmission period, the determination function of the baseband processor 110 inputs a high-speed enable signal to the serializer 150.

When the high-speed enable signal is input, the serializer 150 performs serial transmission by using a high-speed clock. Considering a case of transmitting image data from the baseband processor 110 to the liquid crystal unit 104, first, image data output from the baseband processor 110 is input to the serializer 150. Then, the image data input to the serializer 150 is saved at the buffer management unit 152 provided in the serializer 150. Then, the image data saved at the buffer management unit 152 is read by the PS conversion unit 154, and is converted into a serial signal. At this time, the PS conversion unit 154 generates the serial signal by synchronizing the image data read from the buffer management unit 152 with a high-speed clock and performing parallel-serial conversion.

The serial signal generated by the PS conversion unit 154 is transmitted to the deserializer 170 through the serial signal path 134. At this time, the PS conversion unit 154 transmits together, to the deserializer 170, clock type information. In this case, the serial transmission rate is high. Accordingly, information indicating a high-speed clock is transmitted to the deserializer 170 together with the serial signal. The serial signal and the clock type information transmitted to the deserializer 170 in this manner are input to the SP conversion unit 172 provided in the deserializer 170.

When the serial signal and the clock type information are input, the original image data is restored from the serial signal according to the clock being transmitted. Here, the high-speed clock used at the time of performing serial-parallel conversion at the SP conversion unit 172 provided in the deserializer 170 may be separately generated at the deserializer 170, or may be supplied from the serializer 150 together with the serial signal, or a mechanism for extracting the clock from the serial signal (see JP-2009-267624A, for example) may be provided.

The image data restored by the SP conversion unit 172 is input to the buffer management unit 152, and is saved by the buffer management unit 152. Then, the image data saved by the buffer management unit 152 is input to the liquid crystal unit 104, and is displayed on the liquid crystal unit 104. Additionally, the deserializer 170 adjusts the timing of inputting the image data to the liquid crystal unit 104 according to the type of clock indicated by the clock type information.

(Case 6: Case of Reception Period)

Furthermore, in the case (3) it is a reception period, the determination function of the baseband processor 110 does not input a high-speed enable signal to the serializer 150.

Since a high-speed enable signal is not input, the serializer 150 performs serial transmission by using a low-speed clock. Considering a case of transmitting image data from the baseband processor 110 to the liquid crystal unit 104, first, image data output from the baseband processor 110 is input to the serializer 150. Next, the image data input to the serializer 150 is saved at the buffer management unit 152 provided in the serializer 150. Then, the image data saved at the buffer management unit 152 is read by the PS conversion unit 154, and is converted into a serial signal. At this time, the PS conversion unit 154 generates the serial signal by synchronizing the image data read from the buffer management unit 152 with a low-speed clock and performing parallel-serial conversion.

The serial signal generated by the PS conversion unit 154 is transmitted to the deserializer 170 through the serial signal path 134. At this time, the PS conversion unit 154 transmits together, to the deserializer 170, clock type information. In this case, the serial transmission rate is low. Accordingly, information indicating a low-speed clock is transmitted to the deserializer 170 together with the serial signal. The serial signal and the clock type information transmitted to the deserializer 170 in this manner are input to the SP conversion unit 172 provided in the deserializer 170.

When the serial signal and the clock type information are input, the original image data is restored from the serial signal according to the clock being transmitted. Here, the low-speed clock used at the time of performing serial-parallel conversion at the SP conversion unit 172 provided in the deserializer 170 may be separately generated at the deserializer 170, or may be supplied from the serializer 150 together with the serial signal, or a mechanism for extracting the clock from the serial signal (see JP-2009-267624A, for example) may be provided.

The image data restored by the SP conversion unit 172 is input to the buffer management unit 152, and is saved by the buffer management unit 152. Then, the image data saved by the buffer management unit 152 is input to the liquid crystal unit 104, and is displayed on the liquid crystal unit 104. Additionally, the deserializer 170 adjusts the timing of inputting the image data to the liquid crystal unit 104 according to the type of clock indicated by the clock type information.

As described, the mobile terminal 130 determines whether or not serial transmission jams the wireless communication, by using the determination function of the baseband processor 110, and switches the serial transmission rate (clock frequency) according to the determination result. By switching the serial transmission rate to low in this manner in a situation where the serial transmission jams the wireless communication, the serial transmission can be prevented from jamming the wireless communication while the serial transmission rate is maintained at an averagely high rate. In the foregoing, the functional configuration of the mobile terminal 130 has been described.

[2-4: Control Method of Serial Transmission Rate]

Next, the control method of the serial transmission rate according to the present embodiment will be described in greater detail.

(2-4-1: Control Method According to Wireless Communication Period)

First, a method of controlling serial transmission rate according to a wireless communication period will be described with reference to FIG. 10. FIG. 10 is an explanatory diagram for describing a method of controlling serial transmission rate according to a wireless communication period. Additionally, it is assumed that serial transmission rate is set to high at the time point of start of process of step S101.

Figure 10:
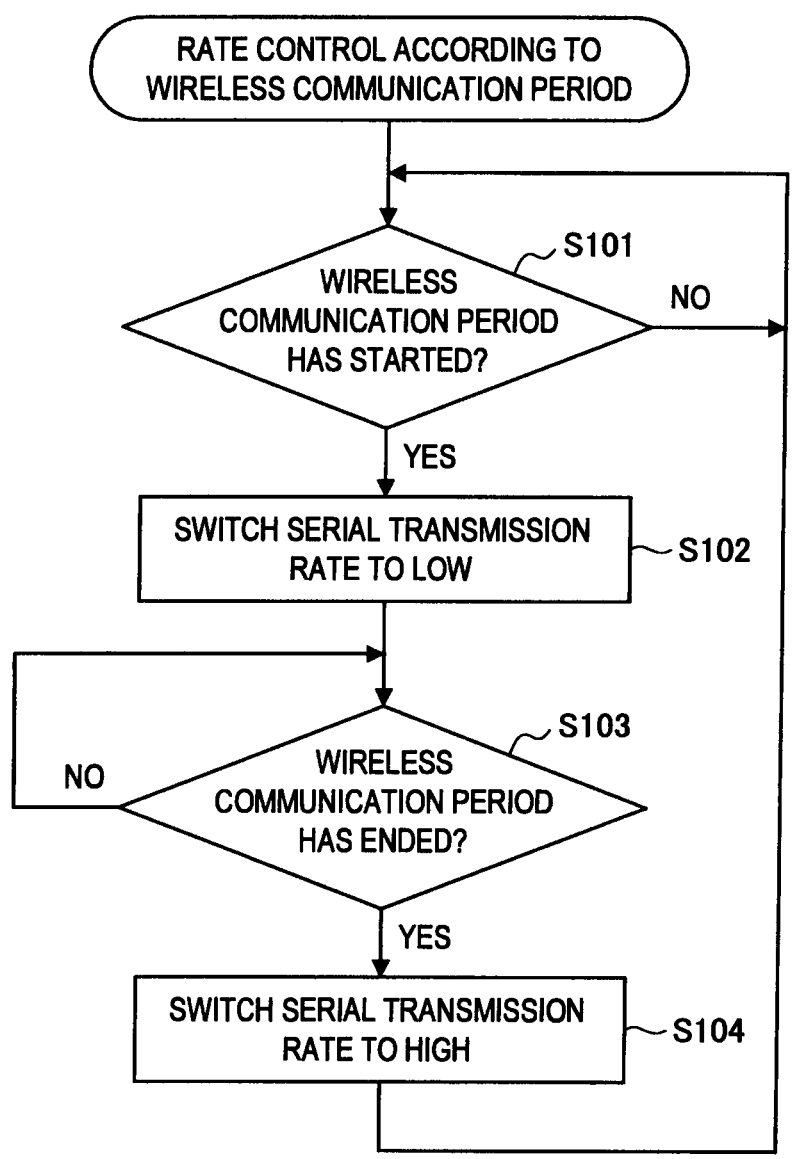
FIG. 10 is an explanatory diagram for describing the control method of serial transmission rate according to the embodiment.

As shown in FIG. 10, the baseband processor 110 determines, by the determination function, whether a wireless communication period has started or not (S101). For example, the baseband processor 110 determines that the wireless communication period has started in the case the start of the period of a time slot assigned to itself (see FIG. 6, for example) is detected. In the case it is determined that the wireless communication period has started, the baseband processor 110 proceeds with the process to step S102. On the other hand, in the case it is determined that the wireless communication period has not started, the baseband processor 110 proceeds with the process again to step S101.

In the case the process proceeded to step S102, the baseband processor 110 stops input of the high-speed enable signal to the PS conversion unit 154 provided in the serializer 150, and switches serial transmission rate to low (S102). Next, the baseband processor 110 determines whether the wireless communication period has ended or not (S103). For example, the baseband processor 110 determines that the wireless communication period has ended in the case the end of the period of the time slot assigned to itself (see FIG. 6, for example) is detected.

In the case it is determined that the wireless communication period has ended, the baseband processor 110 proceeds with the process to step S104. On the other hand, in the case it is determined that the wireless communication period has not ended, the baseband processor 110 proceeds with the process again to step S103. In the case the process has proceeded to step S104, the baseband processor 110 restarts input of the high-speed enable signal to the PS conversion unit 154 provided in the serializer 150, and switches the serial transmission rate to high (S104). Then, the baseband processor 110 proceeds with the process again to step S101.

In the foregoing, the method of controlling the serial transmission rate according to the wireless communication period has been described. When adopting the control method described above, the serial transmission rate becomes low in a wireless communication period, and thus interference between the serial transmission band and the wireless communication band can be prevented. Also, the serial transmission rate can be maintained at a high rate in periods other than the wireless communication period, and a high-speed data transmission through the serial signal path 134 is realized.

(2-4-2: Control Method According to Switching of Transmission/Reception)

Figure 11:
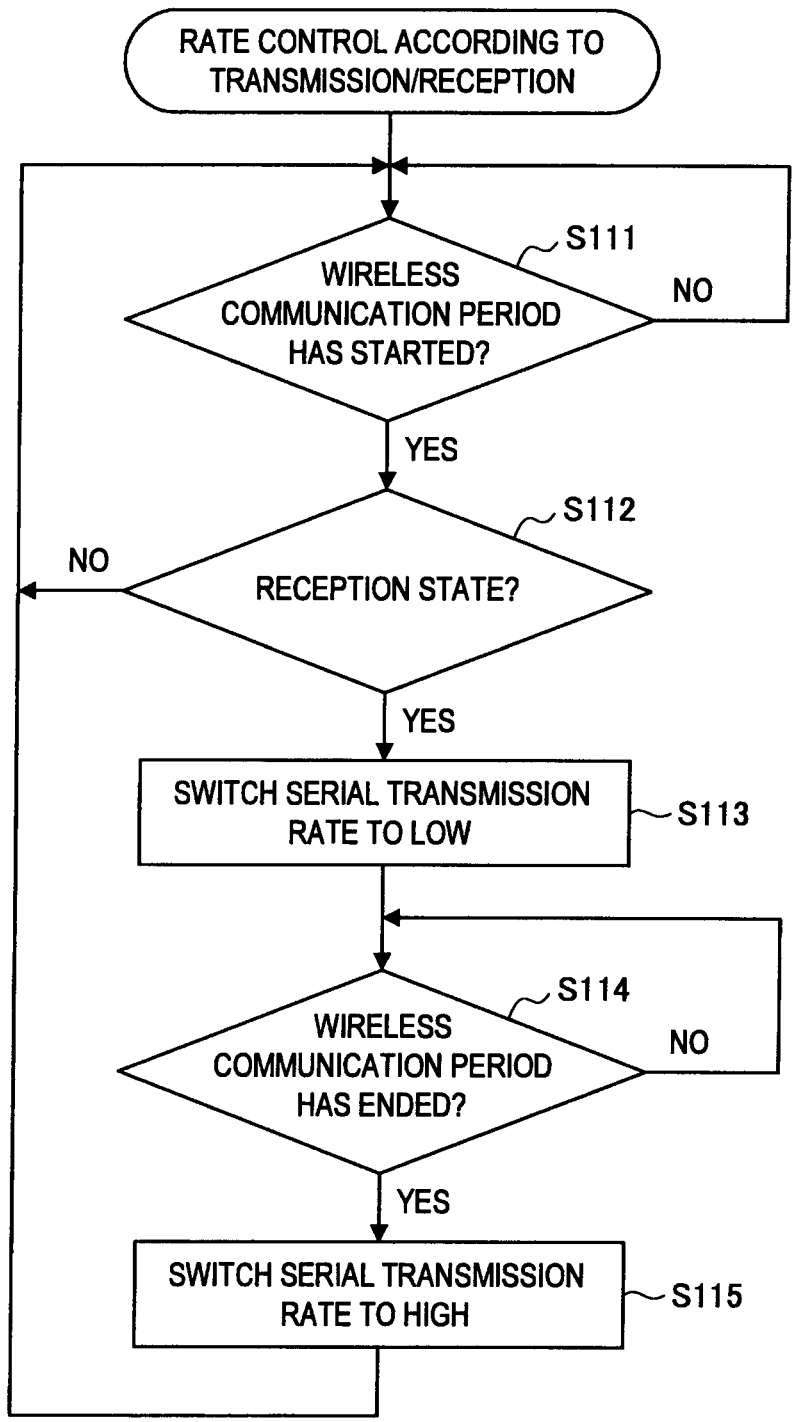
FIG. 11 is an explanatory diagram for describing the control method of serial transmission rate according to the embodiment.

Next, a method of controlling serial transmission rate according to a communication state (reception/transmission) of wireless communication will be described with reference to FIG. 11. FIG. 11 is an explanatory diagram for describing a method of controlling serial transmission rate according to a communication state (reception/transmission) of wireless communication.

As shown in FIG. 11, the baseband processor 110 determines, by the determination function, whether a wireless communication period has started or not (S111). For example, the baseband processor 110 determines that the wireless communication period has started in the case the start of the period of a time slot assigned to itself (see FIG. 6, for example) is detected. In the case it is determined that the wireless communication period has started, the baseband processor 110 proceeds with the process to step S112. On the other hand, in the case it is determined that the wireless communication period has not started, the baseband processor 110 proceeds with the process again to step S111.

In the case the process proceeded to step S112, the baseband processor 110 determines whether it is a reception state or not (S112). In the case it is a reception state, the baseband processor 110 proceeds with the process to step S113. On the other hand, in the case it is not a reception state, the baseband processor 110 proceeds with the process again to step S111.

In the case the process proceeded to step S113, the baseband processor 110 stops input of the high-speed enable signal to the PS conversion unit 154 provided in the serializer 150, and switches serial transmission rate to low (S113). Next, the baseband processor 110 determines whether the wireless communication period has ended or not (S114). For example, the baseband processor 110 determines that the wireless communication period has ended in the case the end of the period of the time slot assigned to itself (see FIG. 6, for example) is detected.

In the case it is determined that the wireless communication period has ended, the baseband processor 110 proceeds with the process to step S115. On the other hand, in the case it is determined that the wireless communication period has not ended, the baseband processor 110 proceeds with the process again to step S114. In the case the process has proceeded to step S115, the baseband processor 110 restarts input of the high-speed enable signal to the PS conversion unit 154 provided in the serializer 150, and switches the serial transmission rate to high (S115). Then, the baseband processor 110 proceeds with the process again to step S111.

In the foregoing, the method of controlling the serial transmission rate according to the communication state of wireless communication has been described. When adopting the control method described above, the serial transmission rate becomes low in a wireless communication period, and thus interference between the serial transmission band and the wireless communication band can be prevented. Particularly, by causing the serial transmission rate to become low only at the time of reception when jamming of wireless communication by interference is significant, the period during which the serial transmission rate is made low becomes short. As a result, the serial transmission rate can be maintained at a high rate also in a transmission period, and the data transmission rate through the serial signal path 134 can be further increased compared to the configuration of FIG. 10.

(2-4-3: Control Method According to Received Radio Wave Intensity)

Figure 12:
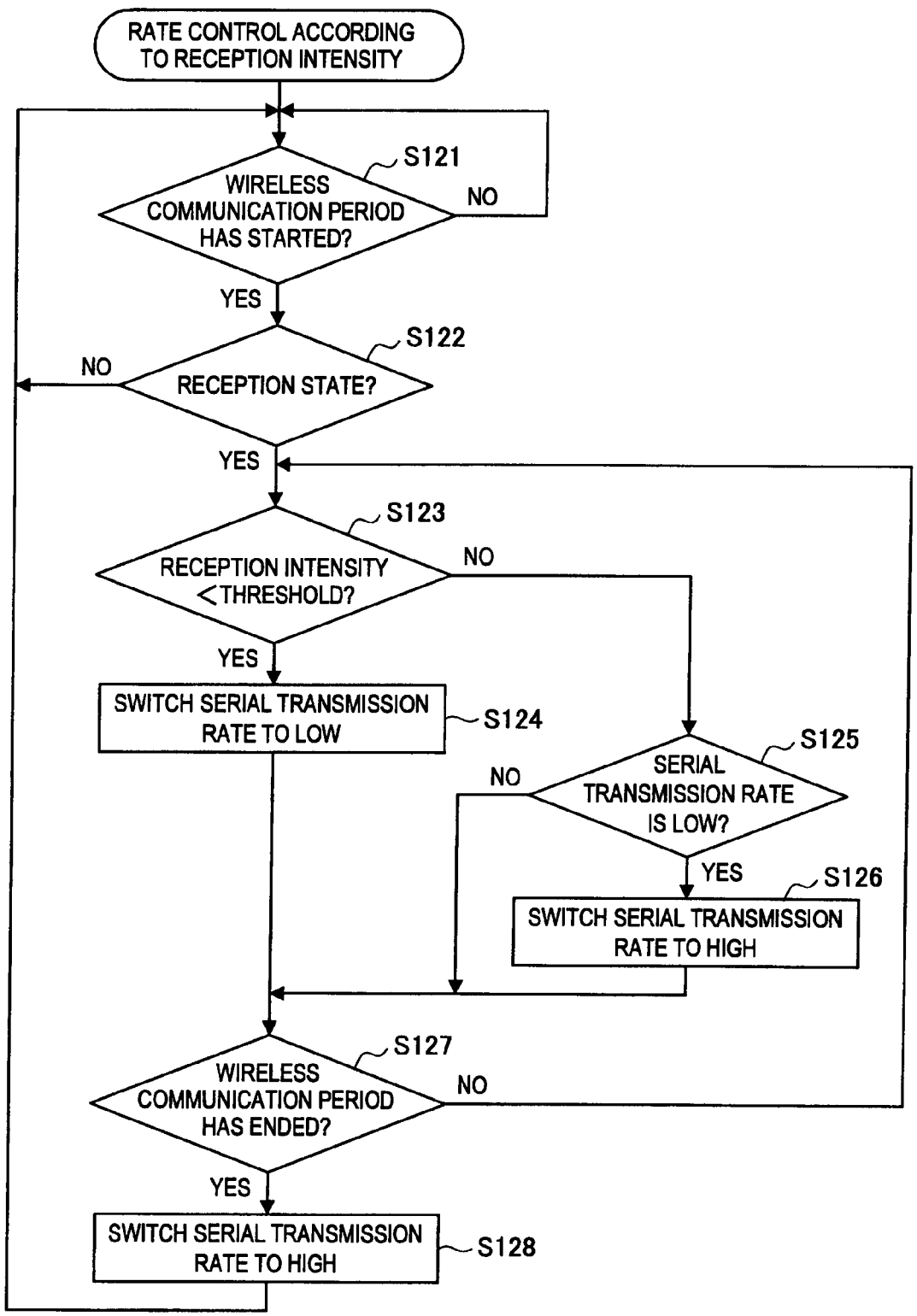
FIG. 12 is an explanatory diagram for describing the control method of serial transmission rate according to the embodiment.

Next, a method of controlling serial transmission rate according to a received radio wave intensity will be described with reference to FIG. 12. FIG. 12 is an explanatory diagram for describing a method of controlling serial transmission rate according to a received radio wave intensity.

As shown in FIG. 12, the baseband processor 110 determines, by the determination function, whether a wireless communication period has started or not (S121). For example, the baseband processor 110 determines that the wireless communication period has started in the case the start of the period of a time slot assigned to itself (see FIG. 6, for example) is detected. In the case it is determined that the wireless communication period has started, the baseband processor 110 proceeds with the process to step S122. On the other hand, in the case it is determined that the wireless communication period has not started, the baseband processor 110 proceeds with the process again to step S121.

In the case the process proceeded to step S122, the baseband processor 110 determines whether it is a reception state or not (S122). In the case it is a reception state, the baseband processor 110 proceeds with the process to step S123. On the other hand, in the case it is not a reception state, the baseband processor 110 proceeds with the process again to step S121.

In the case the process proceeded to step S123, the baseband processor 110 detects a reception intensity, and determines whether the detected reception intensity falls below a predetermined threshold or not (S123). In the case the reception intensity is less than the threshold, the baseband processor 110 proceeds with the process to step S124. On the other hand, in the case the reception intensity is not less than the threshold, the baseband processor 110 proceeds with the process to step S125.

In the case the process proceeded to step S124, the baseband processor 110 stops input of the high-speed enable signal to the PS conversion unit 154 provided in the serializer 150, switches serial transmission rate to low (S124), and proceeds with the process to step S127. On the other hand, in the case the process proceeded to step S125, the baseband processor 110 determines whether the serial transmission rate is low or not (S125). In the case the serial transmission rate is low, the baseband processor 110 proceeds with the process to step S126. On the other hand, in the case the serial transmission rate is high, the baseband processor 110 proceeds with the process to step S127.

In the case the process has proceeded to step S126 from step S125, the baseband processor 110 restarts input of the high-speed enable signal to the PS conversion unit 154 provided in the serializer 150, switches the serial transmission rate to high (S126), and proceeds with the process to step S127. In the case the process has proceeded to step S127, the baseband processor 110 determines whether the wireless communication period has ended or not (S127). For example, the baseband processor 110 determines that the wireless communication period has ended in the case the end of the period of the time slot assigned to itself (see FIG. 6, for example) is detected.

In the case it is determined that the wireless communication period has ended, the baseband processor 110 proceeds with the process to step S128. On the other hand, in the case it is determined that the wireless communication period has not ended, the baseband processor 110 proceeds with the process again to step S123. In the case the process has proceeded to step S128, the baseband processor 110 restarts input of the high-speed enable signal to the PS conversion unit 154 provided in the serializer 150, and switches the serial transmission rate to high or maintains the input of the high-speed enable signal (S128). Then, the baseband processor 110 proceeds with the process again to step S121.

In the foregoing, the method of controlling the serial transmission rate according to the reception intensity has been described. When adopting the control method described above, the serial transmission rate becomes low in a wireless communication period, and thus interference between the serial transmission band and the wireless communication band can be prevented. Particularly, since the serial transmission rate becomes low only in a situation of low reception intensity when jamming of wireless communication by interference is significant, the period during which the serial transmission rate is made low becomes short. As a result, the serial transmission rate can be maintained at a high rate also in a transmission period and a part of a reception period, and the data transmission rate through the serial signal path 134 can be further increased compared to the configuration of FIG. 11.

As has been described, by adopting the technology of the present embodiment, it becomes possible to maintain data transmission rate by serial transmission at a high rate while preventing jamming of wireless communication by the serial transmission.

3: Summary

Lastly, the technical contents of the embodiment of the present invention will be briefly described. The technical contents stated here can be applied to various information processing apparatuses, such as a personal computer, a mobile phone, a portable game machine, a portable information terminal, an information appliance, a car navigation system, and the like.

The functional configuration of the information processing apparatus described above can be expressed as follows. The information processing apparatus includes a wireless communication unit, a data transmission unit, a jamming determination unit, and a rate control unit as follows. The wireless communication unit is means for performing wireless communication by using a predetermined communication band. Also, the data transmission unit is means for transmitting serial data through a predetermined transmission path. As described, the information processing apparatus according to the present embodiment has a function of wireless communication and a function of data transmission.

Furthermore, the jamming determination unit is means for determining whether or not a transmission band used for transmission of the serial data by the data transmission unit jams the communication band used for the wireless communication by the wireless communication unit. Furthermore, the rate control unit is means for switching a transmission rate of the serial data to low by controlling the data transmission unit, in a case the jamming determination unit determines that the transmission band used for transmission of the serial data jams the communication band used for the wireless communication.

As has been described, when the data transmission rate increases, the serial transmission band and the wireless communication band interferes with each other and serial transmission jams the wireless communication. However, when adopting the above configuration, since the serial transmission rate is switched to low at the timing of occurrence of jamming, the serial transmission band and the wireless communication band does not interfere with each other. Also, since the serial transmission rate is maintained at a high rate at timings other than the timing of occurrence of jamming, data can be transmitted at a high rate while avoiding the interference between the serial transmission band an the wireless communication band.

(Notes)

The switch 190 and the baseband processor 110 are examples of a wireless communication unit. The serializer 150 and the deserializer 170 are examples of a data transmission unit. The serial signal path 134 is an example of a predetermined transmission path. The baseband processor 110 is an example of a jamming determination unit, a rate control unit, a reception intensity detection unit, and an arithmetic processing unit. The operation unit 108 is an example of a first module. The PS conversion unit 154 is an example of a parallel-serial conversion unit. The display unit 102 is an example of a second module. The SP conversion unit 172 is an example of a serial-parallel conversion unit. The liquid crystal unit 104 is an example of an output unit.

It should be understood by those skilled in the art that various modifications, combinations, sub-combinations and alterations may occur depending on design requirements and other factors insofar as they are within the scope of the appended claims or the equivalents thereof.

The present application contains subject matter related to that disclosed in Japanese Priority Patent Application JP 2010-103705 filed with the Japan Patent Office on Apr. 28, 2010, the entire content of which is hereby incorporated by reference.

What is claimed is:

1. A communication apparatus comprising:
a main body portion;
a display portion;
a wireless communication unit for performing wireless communication by using a predetermined communication band;
a data transmission unit for transmitting serial data through a predetermined transmission path between the main body portion and the display portion;
a jamming determination unit for determining whether or not a transmission band used for transmission of the serial data between the main body portion and the display portion by the data transmission unit jams the communication band used for the wireless communication by the wireless communication unit; and
a rate control unit for switching a transmission rate of the serial data to low by controlling the data transmission unit, in a case the jamming determination unit determines that the transmission band used for transmission of the serial data jams the communication band used for the wireless communication.

2. The communication apparatus according to claim 1, wherein, in a case the wireless communication unit is performing wireless communication, the jamming determination unit determines that the transmission band used for transmission of the serial data jams the communication band used for the wireless communication by the wireless communication unit.

3. The communication apparatus according to claim 2, wherein, in a case the wireless communication unit is receiving a radio wave, the jamming determination unit determines that the transmission band used for transmission of the serial data jams the communication band used for the wireless communication by the wireless communication unit.

4. The communication apparatus according to claim 3, further comprising:

a reception intensity detection unit for detecting an intensity of the radio wave received by the wireless communication unit, wherein, in a case the intensity of the radio wave detected by the reception intensity detection unit is less than a predetermined intensity, the jamming determination unit determines that the transmission band used for transmission of the serial data jams the communication band used for the wireless communication by the wireless communication unit.

5. The communication apparatus according to claim 4, wherein the communication apparatus is formed from first and second modules connected via the predetermined transmission path, wherein the first module includes
an arithmetic processing unit that outputs parallel data, and
a parallel-serial conversion unit that generates the serial data by serializing the parallel data output by the arithmetic processing unit, wherein the data transmission unit transmits the serial data generated by the parallel-serial conversion unit through the predetermined transmission path, and wherein the second module includes
a serial-parallel conversion unit that generates the parallel data by parallelizing the serial data transmitted by the data transmission unit, and
an output unit that outputs the parallel data generated by the serial-parallel conversion unit.

6. The communication apparatus according to claim 5, wherein the data transmission unit transmits information relating to the transmission rate of the serial data together with the serial data.

7. The communication apparatus according to claim 1, wherein the communication apparatus is formed from first and second modules connected via the predetermined transmission path, wherein the first module includes
an arithmetic processing unit that outputs parallel data, and
a parallel-serial conversion unit that generates the serial data by serializing the parallel data output by the arithmetic processing unit, wherein the data transmission unit transmits the serial data generated by the parallel-serial conversion unit through the predetermined transmission path, and wherein the second module includes
a serial-parallel conversion unit that generates the parallel data by parallelizing the serial data transmitted by the data transmission unit, and
an output unit that outputs the parallel data generated by the serial-parallel conversion unit.

8. The communication apparatus according to claim 7, wherein the data transmission unit transmits information relating to the transmission rate of the serial data together with the serial data.

9. A data transmission method performed by a communication apparatus including a wireless communication unit for performing wireless communication by using a predetermined communication band and a data transmission unit for transmitting serial data through a predetermined transmission path between a main body portion and a display portion, comprising the steps of:

determining whether or not a transmission band used for transmission of the serial data between the main body portion and the display portion by the data transmission unit jams the communication band used for the wireless communication by the wireless communication unit; and switching a transmission rate of the serial data to low by controlling the data transmission unit, in a case of determining, in the step of determining, that the transmission band used for transmission of the serial data jams the communication band used for the wireless communication.

* * * * *